(No Model.) 2 Sheets—Sheet 1.

L. SIGMUND.
MACHINE FOR CUTTING CHEESE, &c.

No. 553,434. Patented Jan. 21, 1896.

Witnesses:
Jas. E. Hutchinson.
Henry C. Hazard.

Inventor.
Louis Sigmund
by Pinder and Russell
his attorneys (No Model.) 2 Sheets—Sheet 2.

L. SIGMUND.
MACHINE FOR CUTTING CHEESE, &c.

No. 553,434. Patented Jan. 21, 1896.

Witnesses:
Jas. E. Hutchinson
Henry C. Hazard

Inventor:
Louis Sigmund

UNITED STATES PATENT OFFICE.

LOUIS SIGMUND, OF NAPERVILLE, ILLINOIS.

MACHINE FOR CUTTING CHEESE, &c.

SPECIFICATION forming part of Letters Patent No. 553,434, dated January 21, 1896.

Application filed March 28, 1895. Serial No. 543,491. (No model.)

*To all whom it may concern:*

Be it known that I, LOUIS SIGMUND, of Naperville, in the county of Du Page, and in the State of Illinois, have invented certain new and useful Improvements in Machines for Cutting Cheese, &c.; and I do hereby declare that the following is a full, clear, and exact description thereof, reference being had to the accompanying drawings, in which—

Figure 1:
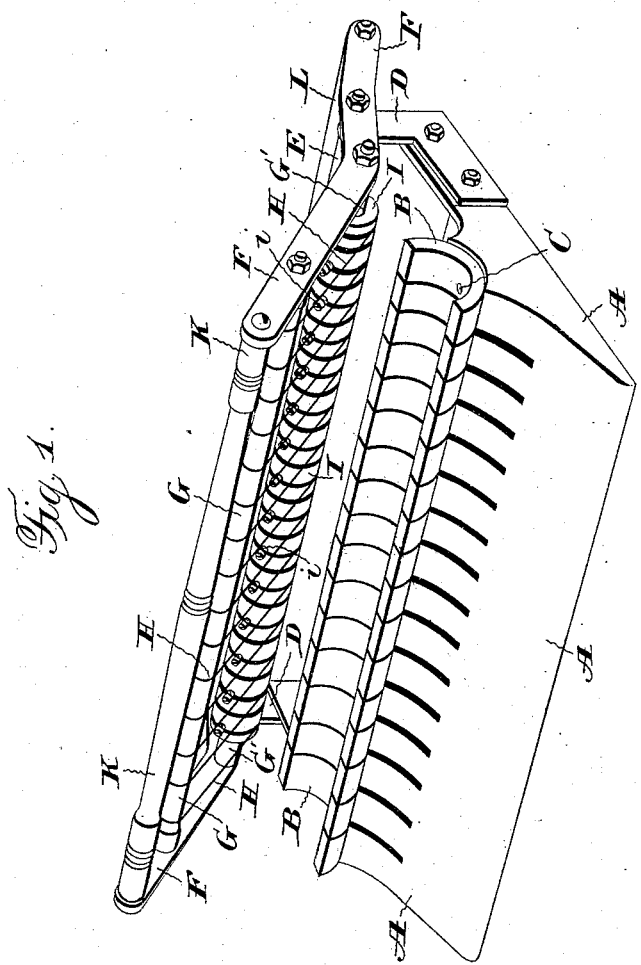
Figure 2:
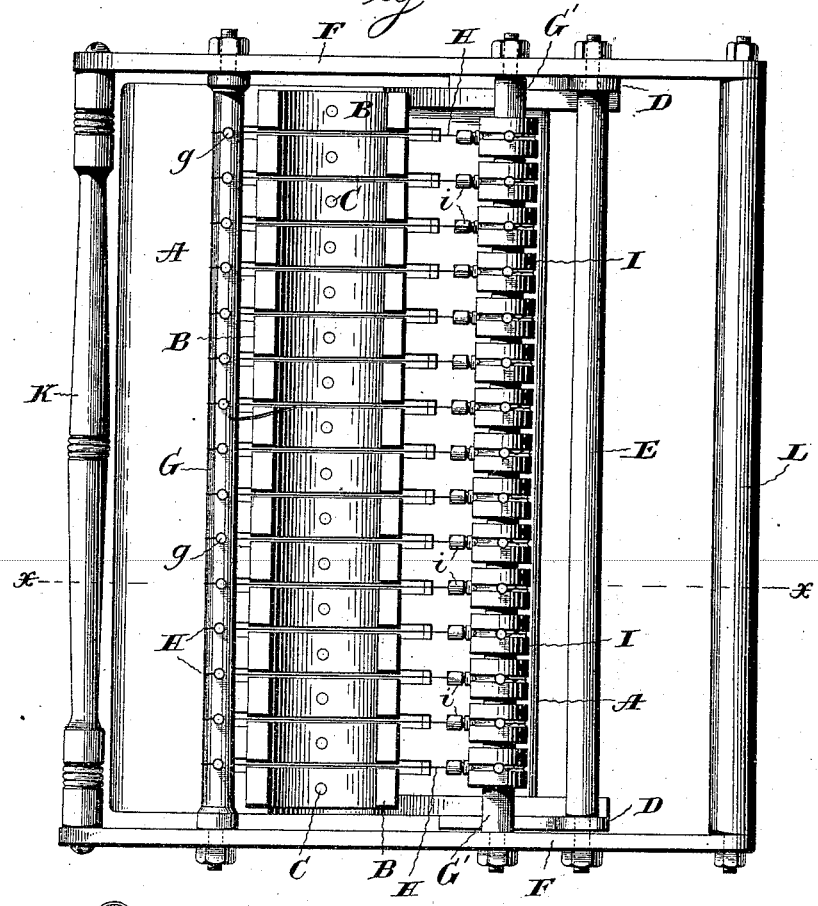
Figure 3:
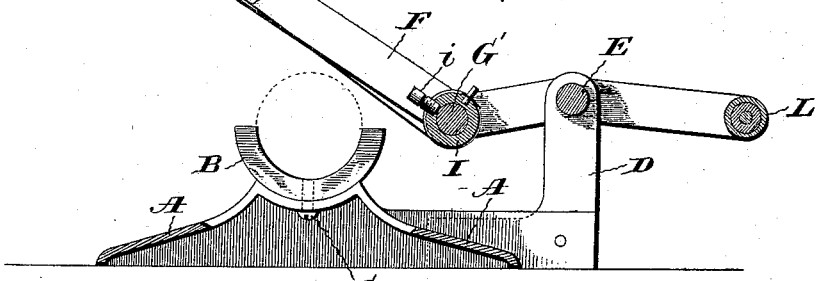

Figure 1 is a perspective view of my cheese-cutting device. Fig. 2 is a plan view thereof, and Fig. 3 is a vertical section on the line $x\ x$ of Fig. 2.

Letters of like name and kind refer to like parts in each of the figures.

The object of my invention is to provide a simple and efficient machine for cutting cheese, which comes from the press in blocks of considerable length, into cakes of a size suitable for commercial use; and to this end said invention consists in the cutting-machine and in the parts thereof constructed and combined substantially as and for the purpose hereinafter specified.

In the carrying of my invention into practice I employ a base A, preferably of metal, and secure to the upper side thereof a trough-shaped bed or support for the cheese to be cut, which support, as illustrated in the drawings, is semicircular in cross-section, as it is designed for use with blocks of cheese of cylindrical shape. Said support is composed of a series of similar semicircular pieces or segments B and B that are secured alongside of each other, with a slight space between adjacent ones, by means of a screw C for each that is passed from the under side of the base A through a hole therein into a threaded opening in the segment.

Attached to each end of the base A, at the rear side thereof, are two vertical arms D and D, which support a shaft or rod E, upon whose opposite ends are pivoted two side bars F and F, that form part of the cutter-carrying frame. Attached to said bars and placed at points, respectively, in front and rear of the cheese bed or support are two round rods or bars G and G', to which are attached a series of wires H and H, corresponding in number to the number of spaces between the pieces B and B, and located so as to be adapted to be passed through such spaces. Each of said wires is fastened at one end to the front bar, G, by being looped over a pin $g$ driven therein, and at its other end is fastened in like manner to a collar I upon the rear bar, G', which collar is adapted to be rotated upon the bar to adjust the tension of the wire, and being held at the desired point by means of a set-screw $i$ tapped radially through the same, so as to bear against the bar.

The shape of the side bars F and F is such that the wires H and H do not extend in a radial line from the pivot of said bars, but are tangential thereto, so that the wires in passing through a cheese have a compound movement, made up of a rotary and a longitudinal motion, which results in the production of a draw-cut that obviates the crumbling or breaking of the cheese, which occurs when the cutters emerge from the blocks if a simple movement in one direction only is given them.

The side bars F and F are connected just in advance of the bar G by a cross-bar K that serves as a handle for swinging the cutter-carrying frame, while to extensions of said side bars, in rear of the pivot-fod E, is attached a lead-filled tubular rod L that serves as a counterbalance.

With my machine a block of cheese of the length in which it comes from the press can be quickly and easily cut at one operation into a number of cakes, and not only can the machine be operated by unskilled labor, but the work is much more satisfactorily done than is possible by skilled labor with the means heretofore used.

It is to be understood that I do not limit myself to the details of construction shown and described, as changes can be made therein which will involve no departure from the scope of my invention; nor do I limit the use of my invention only to the cutting of cheese.

Having thus described my invention, what I claim is—

1. In a cheese cutter, the combination of a support or bed for the block to be cut, a frame having two rods or bars, a series of rotatable collars, upon one of said bars, a series of wires attached at one of their ends to the collars, and at their other ends to the other bar, and means to hold said collars as adjusted, substantially as and for the purpose specified.

2. In a cheese cutter, the combination of a support or bed for the block to be cut, a frame having two rods or bars, a series of rotatable collars upon one of said bars, a series of wires attached at one of their ends to pins upon the collars, and at their other ends to pins on the other bar, and a set screw for each collar, to hold the same in position upon the bar, substantially as and for the purpose shown.

3. In a cheese cutter, the combination of a support for the block to be cut, a pivoted frame carrying two parallel rods or bars, a series of rotatable collars upon one of said bars, a series of wires attached at one of their ends to the collars, and at their other ends to the other bar, the direction of said wires being tangential to the frame pivot, and means to hold said collars as adjusted on their bar, substantially as and for the purpose set forth.

4. In a cheese cutter, the combination of a support for the block to be cut, the two pivoted side bars, the cross bar forming a handle connecting the latter, the two rods or bars connecting the side bars at a point between their pivots and the handle, the wires stretched between said rods or bars in lines tangential to the pivot, and the counterbalance rod connecting the side bars, substantially as and for the purpose described.

In testimony that I claim the foregoing I have hereunto set my hand this 6th day of March, A. D. 1895.

LOUIS SIGMUND.

Witnesses:
   JOSEPH A. REUSS,
   E. T. PRINDLE.